March 17, 1970 F. R. SWANSON ET AL Re. 26,827

TOOL SUPPORTING ADAPTER

Original Filed Sept. 29, 1960 7 Sheets-Sheet 1

Inventors
Fred R. Swanson
Carl Erikson
By Hoffgren, Brady, Wegner, Allen & Stellman
Attorneys

TOOL SUPPORTING ADAPTER

Original Filed Sept. 29, 1960 7 Sheets-Sheet 2

TOOL SUPPORTING ADAPTER

Original Filed Sept. 29, 1960 7 Sheets-Sheet 4

TOOL SUPPORTING ADAPTER

Original Filed Sept. 29, 1960 7 Sheets-Sheet 5

TOOL SUPPORTING ADAPTER

Original Filed Sept. 29, 1960 7 Sheets-Sheet 6

United States Patent Office

Re. 26,827
Reissued Mar. 17, 1970

26,827
TOOL SUPPORTING ADAPTER

Fred R. Swanson, Rockford, and Carl Erikson, Belvidere, Ill., assignors to Sundstrand Corporation, a corporation of Illinois Original No. 3,136,563, dated June 9, 1964, Ser. No. 59,236, Sept. 29, 1960. Application for reissue Apr. 18, 1967, Ser. No. 693,027
Int. Cl. B23b *31/12*
U.S. Cl. 279—83 4 Claims

Matter enclosed in heavy brackets [ ] appears in the original patent but forms no part of this reissue specification; matter printed in italics indicates the additions made by reissue.

*ABSTRACT OF THE DISCLOSURE*

*A tool supporting adapter having an adjustable stop at one end thereof for controlling the over-all length of the tool and the adapter, with the adapter having a circumferential handling groove with inclined sides, and a keyway with inclined sides for keying the adapter to a rotatable spindle.*

This invention relates to a tool supporting adapter and more particularly to an adapter facilitating support, handling and driving of a tool usable with a machine tool and which facilitates use of many different tools selectively with a machine tool by means of tool changing apparatus.

An object of the invention is to provide a new and improved tool adapter facilitating support, handling and driving of a tool.

Another object of the invention is to provide a tool supporting adapter having a body to which a tool can be affixed with means at an end of the body variably extendible to provide a predetermined over-all length for the adapter and the tool carried thereby adjustable to compensate for variation of tool length.

Another object of the invention is to provide an adapter as defined in the preceding paragraph in which said body additionally has an external groove therearound extending transversely to the length of the body with a cross-sectional shape facilitating engagement, holding and release of the adapter by tool changing mechanism.

A further object of the invention is to provide a tool supporting adapter as defined in the preceding paragraph in which the adapter body has an external keyway of longitudinal extent with sloped sides defining an outwardly increasing cross-sectional width for the keyway for driving connection with a key of a matching shape associated with the drive spindle.

Still another object of the invention is to provide an adapter for use in a machine having a head with a rotatable spindle, said spindle having an internal tapered bore with a collet having an external taper and defining a cylindrical interior chamber, said collet further having an elongate opening through which a driving key extends into said interior chamber, the adapter comprising a cylindrical body adapted to receive a tool adjacent one end thereof, adjustable means at an end of the adapter body for determining the depth to which the body extends into the collet to provide a constant distance between the spindle and the tool, an external keyway in said adapter body extending lengthwise thereof for interengagement with said driving key to align the adapter with the spindle and transmit torque from the spindle to the adapter, and a continuous external groove in the adapter body located to be outside the spindle when the adapter is in said collet for grasping of the adapter by tool changing mechanism associated with the machine.

Further objects and advantages will become apparent from the following detailed description taken in connection with the accompanying drawings in which.

Figure 7:
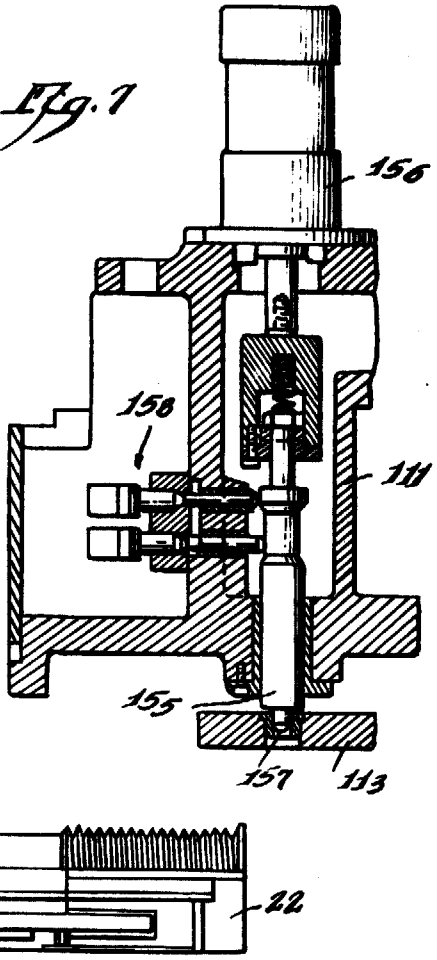
FIG. 7 is a horizontal section on an enlarged scale through the locating mechanism for the tool changing mechanism shown in part in FIG. 5.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Figure 1:
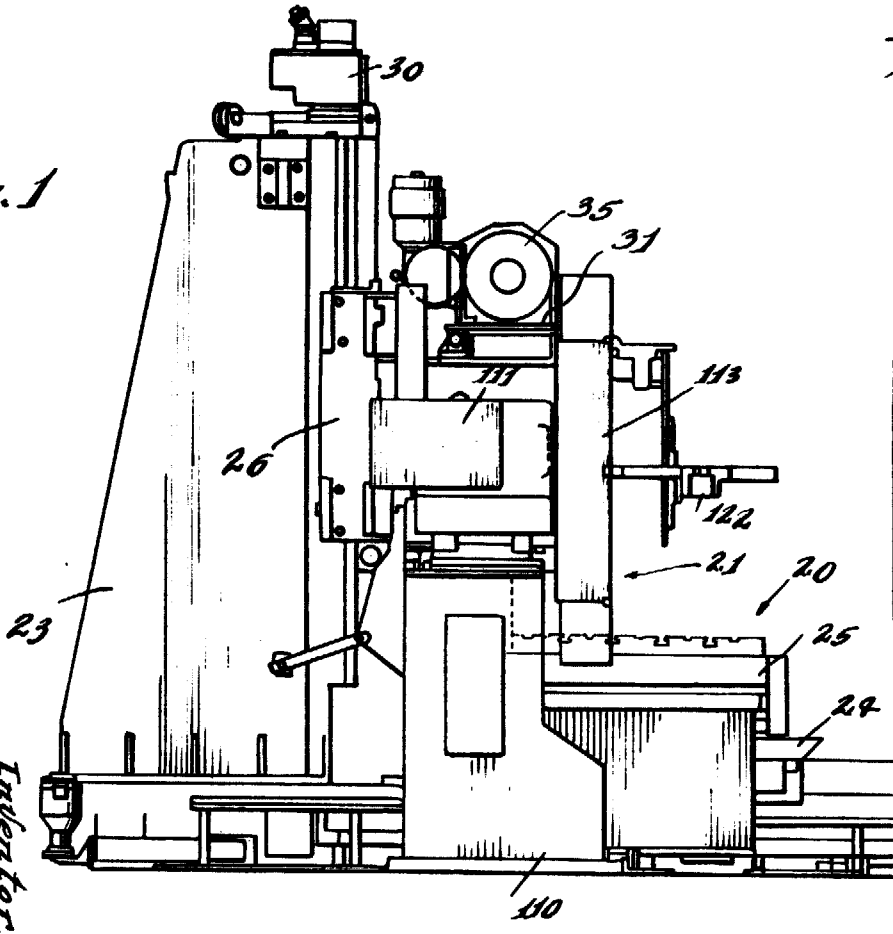
FIG. 1 is a side elevational view of a machine tool and tool changing mechanism for support, handling and driving of the tool adapter.
Figure 2:
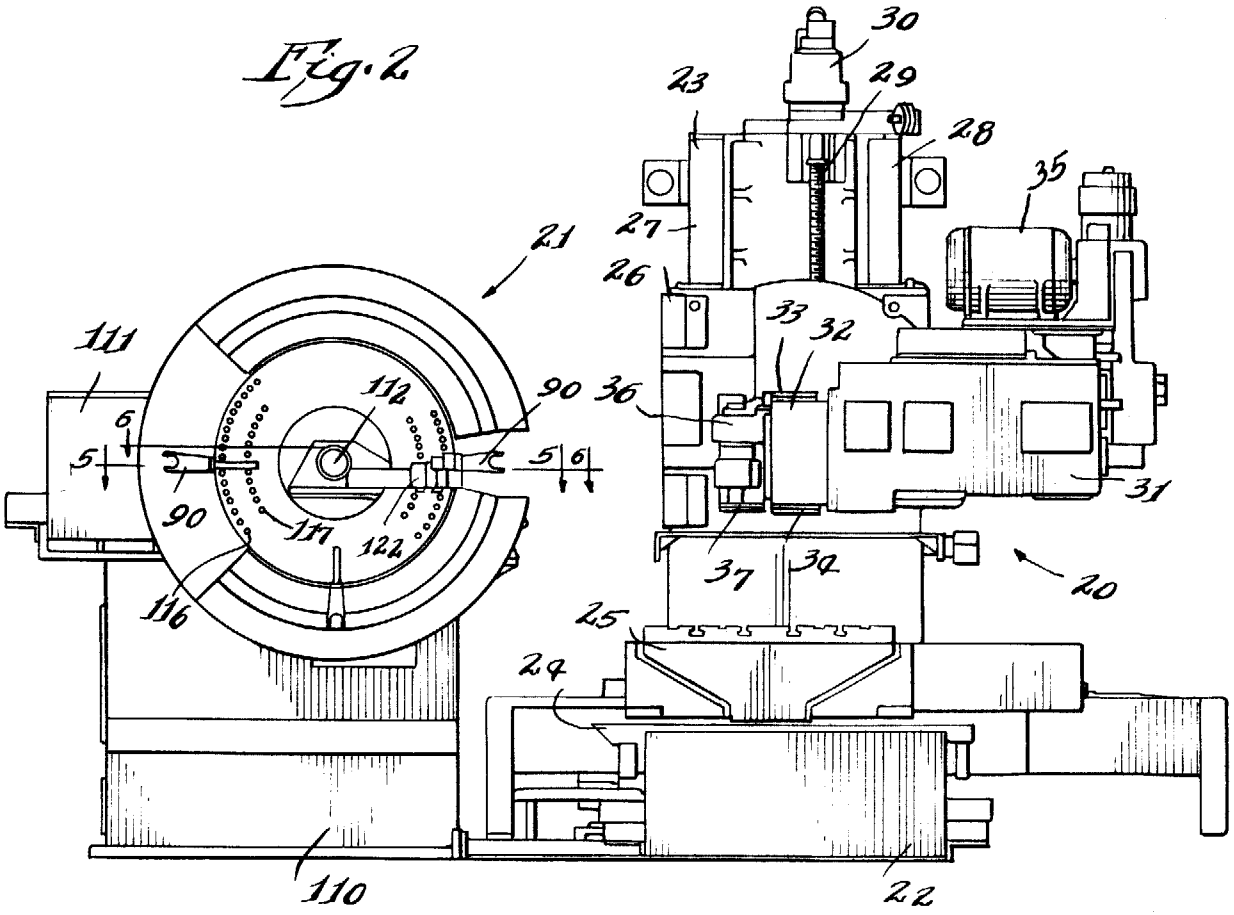
FIG. 2 is a front elevational view of the structure shown in FIG. 1 with the tool changing mechanism shown in an inactive position remote from the machine tool.
Figure 3:
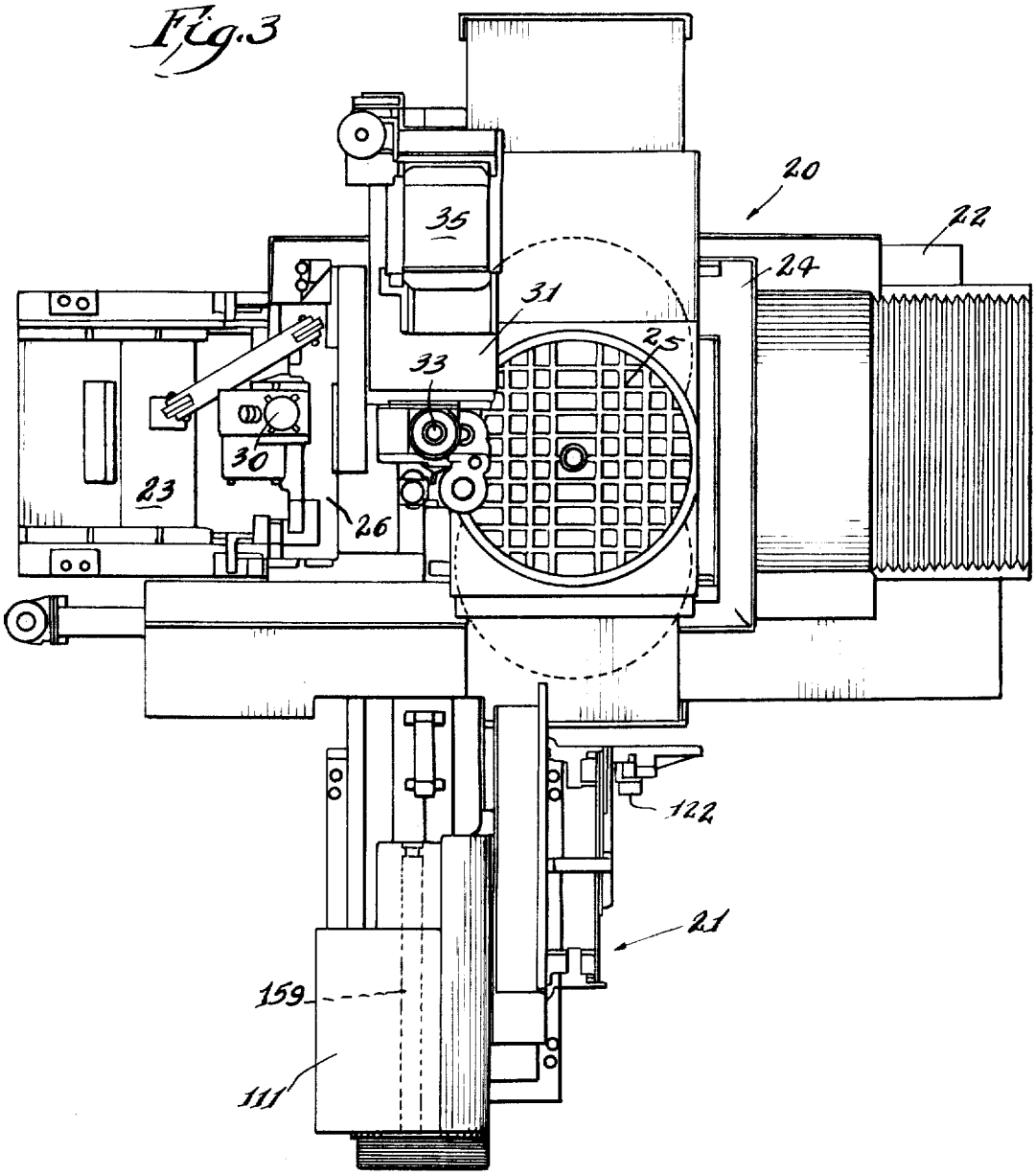
FIG. 3 is a plan view of the mechanism shown in FIGS. 1 and 2.

As shown in FIGS. 1, 2 and 3, a machine tool indicated generally at 20 and a tool changing mechanism indicated generally at 21 are provided for performing a variety of machining operations by seriatim utilization of a plurality of the tool supporting, handling and driving adapters described hereinafter.

The machine tool 20 embodies a base 22 having an upstanding column 23 at an end thereof and has suitable ways extending toward the column to support a saddle 24 for movement toward and away from the column. The saddle has a work supporting table 25 with linear movement transverse to that of the saddle 24 provided by suitable ways on the saddle and the table also has rotary movement about a vertical axis.

The column 23 movably mounts a vertical feeding saddle 26 mounted on column ways 27 and 28 and movable up and down by means of a lead screw 29 rotatably mounted on the column and driven by a motor 30 at the top of the column. A transmission head 31 is carried on the vertical feeding saddle 26 and rotatably adjustably mounts a spindle head 32 which permits either spindle 33 or spindle 34 to be operative and also permits either of the spindles to assume a position for tool changing, as described more fully hereinafter.

The transmission head 31 is of the type shown generally in the copending application of Fred R. Swanson and Carl F. Erikson, Ser. No. 715,109, filed Feb. 13, 1958, in which a motor 35 through a multi-speed transmission rotates the spindles 33 and 34, one in a relatively high speed range and the other in a relatively low speed range with each spindle having a number of speeds. The construction of the spindle head 32 will be more fully described subsequently.

The spindle head 32 mounts an auxiliary head 36 which has an axially movable rotatable spindle 37 for use in operations such as tapping.

Figure 4:
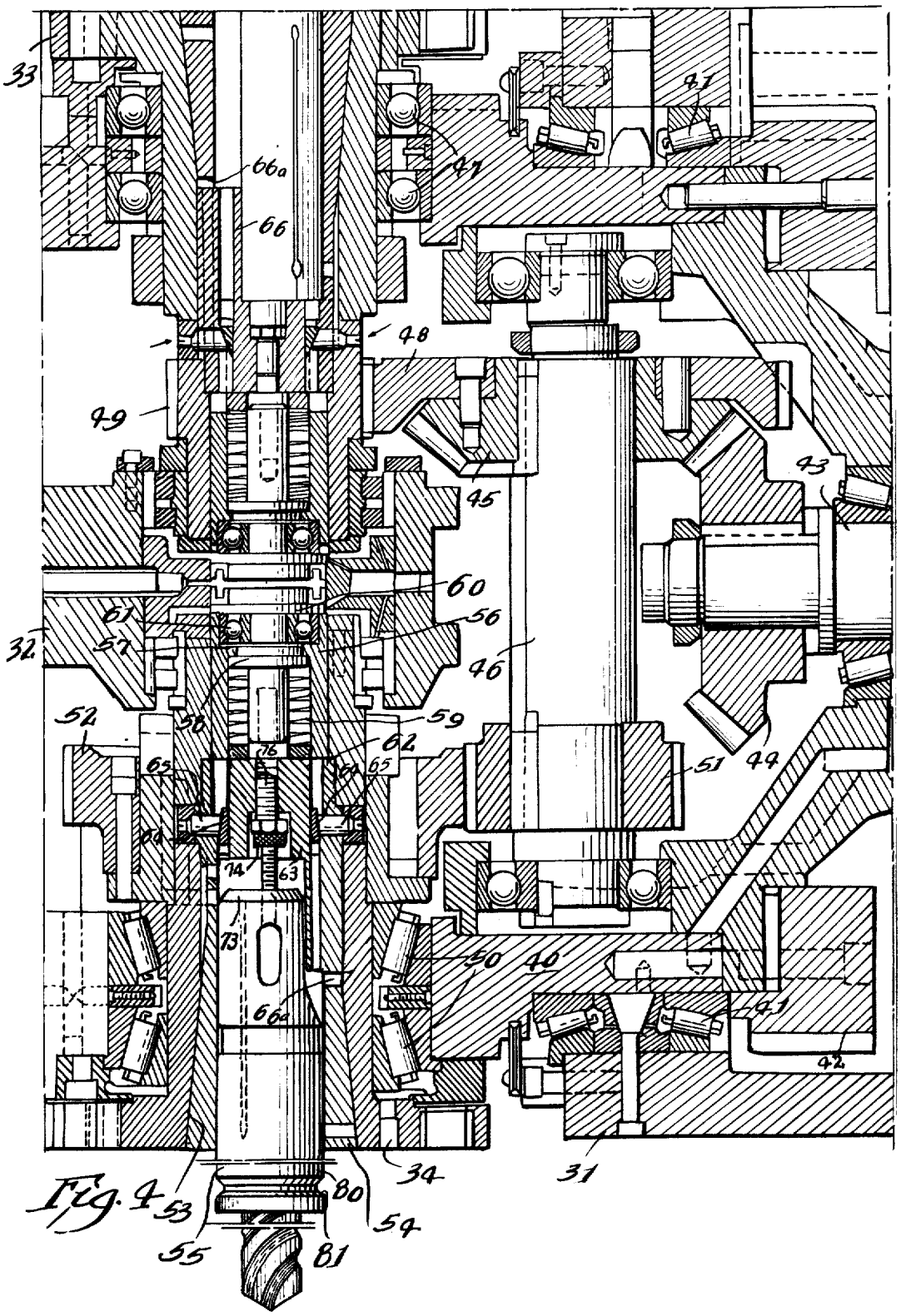
FIG. 4 is a central horizontal section on an enlarged scale through the rotatably adjustable spindle head which is positioned, as shown, with the spindles horizontal and shown with a tool adapter positioned in one of the spindles.

Referring to FIG. 4, the spindle head 32, the rotatable mounting thereof on the transmission head 31 and the drive for rotating the spindles are shown. The spindle head 32 has an annular part 40 which fits within an opening in the transmission head 31 and which is rotatably mounted therein by a plurality of roller bearings 41. The annular part 40 of the spindle head has a gear 42 affixed thereto whereby the spindle head 32 is rotatably positioned by power means gearingly connected to the gear 42.

The spindles 33 and 34 are driven from an output shaft 43 of the transmission through a bevel gear 44 engaging a bevel gear 45 fixed to a rotatable stub shaft 46. The high speed spindle 33 is supported by ball bearings 47 for rotation by a gear 48 connected to the bevel gear 45 and meshing with a gear 49 on the spindle.

The low speed spindle 34 is rotatably supported by roller bearings 50 and is driven from a gear 51 on the stub shaft meshing with a gear 52 on the spindle.

Each of the spindles 33 and 34 are of a generally similar construction with respect to the structure by which a tool adapter is mounted therein and reference is hereinafter made to the spindle 34 in describing the specific construction with the description being equally applicable to the spindle head 33. The spindle 34 has an internal tapered bore 53 and a collet 54 is positioned in the bore with a tapered outer contour engageable with the wall of the bore. The collet 54 has a central opening defining a cylindrical interior chamber for receiving a tool adapted 55 (FIG. 12) as shown in FIG. 4. The collet 54 has an inner end 56 provided with a flange 57 against which a plug 58 abuts with pre-loaded spring washers 59 exerting force through the plug against the flange 57 to draw the collet into the bore of the spindle. The tapered relation between the spindle bore and collet act to compressively engage and hold the tool adapter 55. In order to release a tool adapter from the collet, a piston 60 is mounted within a chamber which is selectively connected to a source of fluid under pressure which lowers the piston 60 as viewed in FIG. 4 to lower the collet through the thrust bearing 61. The spring washers 59 are in engagement with a ring 62 which is rigidly connected to the spindle 34 through a plug 63 which has wedges 64 which when moved upwardly as viewed in FIG. 4 extend the pins 65 laterally out into engagement with the spindle 34 to lock the plug 63 to the spindle. The plug construction permits replacement of a collet 54 without removing the spindle.

Figures 6, 14:
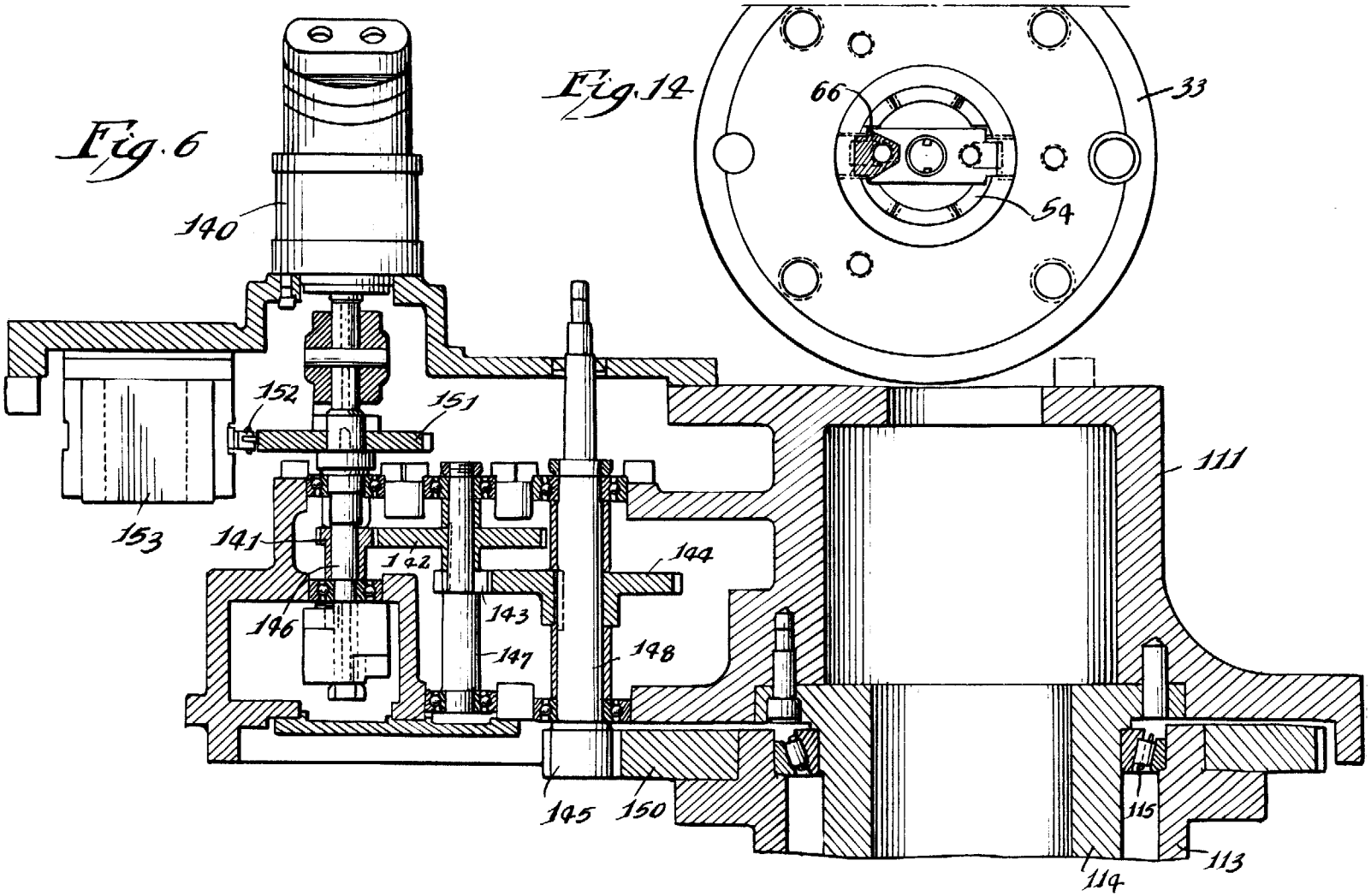
FIG. 6 is a generally horizontal section through the drive for the tool changing mechanism taken generally along the line 6—6 in FIG. 2.
FIG. 14 is a fragmentary end elevational view of a spindle shown in FIG. 4.

The plug 63 has a key 66 extending into the spindle bore and through a longitudinal opening 66a in the wall of the collet 54 in position to make driving engagement with a keyway in the spindle adapter 55. The longitudinal opening in the collet wall as well as a similar opening at the opposite side thereof permit the extension of the pins 65 laterally outward into the spindle to lock the plug 63 in place. As shown in FIG. 14, the key has longitudinally extending tapered sides to closely fit with the matching keyway in the adapter, as described subsequently.

With the driving key construction referred to above, torque loads are not taken by the collet 54 and rotary slippage of the adapter 55 is avoided to prevent pulling the tool out of the spindle. The key also insures that single point tools are always used in the same position with respect to the spindle run-out, which improves hole accuracy from part to part. The tapered side construction of the key results in directing the driving forces imparted to the adapter from the spindle in a direction to eliminate key twist.

Figure 11:
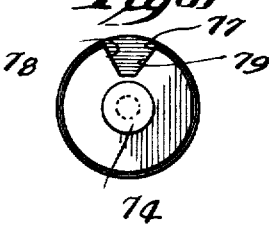
FIG. 11 is an end elevational view of the adapter shown in FIG. 10 looking toward the left-hand end thereof.
Figure 10:
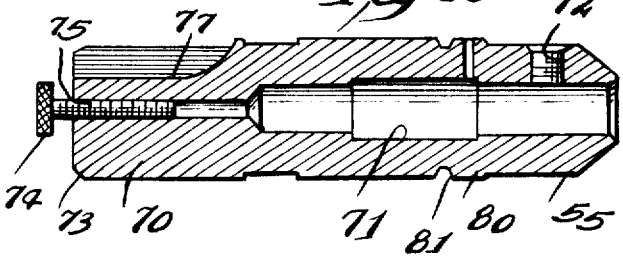
FIG. 10 is a vertical section through one form of tool adapter.

One form of tool adapter 55 is shown in FIGS. 10 and 11 in which an adapter body 70 is formed with a cylindrical interior 71 for receiving the shank of a tool and a tool is held in place in the adapter by a locking bolt threaded into the threaded opening 72 in the body and into engagement with the shank of a tool. The body of the adapter has a straight shank with a taper indicated at 73 on an end of the body to facilitate entry of the adapter into the spindle. The adapter has means at an end thereof for determining the depth to which the adapter body will extend into the collet. This means is variably extendible to provide a predetermined over-all length for the adapter and a tool carried thereby and adjustable to compensate for variation of tool length due to tool sharpening and comprises an adjustable stop button 74 which is threadably mounted in an opening 75 in the adapter body. As shown in FIG. 4, the button 74 engages a bolt 76 on the spindle plug 63 to set the depth to which the adapter is placed in the spindle.

As shown in FIG. 11, the adapter has a longitudinally extending keyway 77 with sloped sides 78 and 79 which match the keyway to the key 66 in the spindle.

The adapter body also has an annular portion 80 which is provided with a tool handling groove 81 providing for support and handling of the adapter when not secured in the spindle. This groove is of a generally V-shaped cross-section with tapered side walls to provide for ease of entry of a tool adapter gripper described more fully hereinafter and to also insure holding of an overhung load due to particular types of tools. The groove 81 is located on the body at a location to lie outside the spindle when the adapter is carried thereby, as shown in FIG. 4, to permit access thereto.

Figure 13:
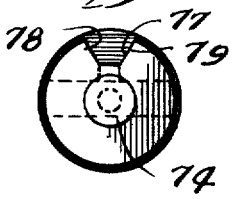
FIG. 13 is an end elevational view of the adapter shown in FIG. 12 looking toward the left-hand end thereof.
Figure 12:
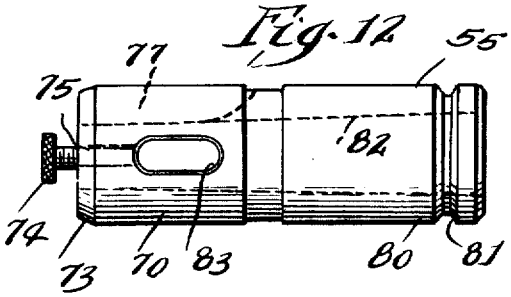
FIG. 12 is an elevational view of another form of tool adapter.

In the adapter embodiment of FIGS. 12 and 13, which is shown specifically mounted in the spindle in FIG. 4, the construction is generally the same as in FIGS. 10 and 11 with similar parts given the same reference numeral, however the interior of the adapter body 70 has a taper 82 to receive the shank of a tool and a knock-out opening 83 permits access to the interior of the adapter.

It will be noted that the adapters 55 disclosed in FIGS. 10 and 12 each are similar in that the distance of the tool supporting and handling groove 81 is the same relative to the end of the adapter body receiving the adjustable button 74, even though there are different lengths of adapter body extending from the opposite side of the groove. With this constant distance, the depth to which the adapter will seat in the spindle is uniformly established, subject to the final positioning obtained by the positioning of the adjustable button 74.

Figure 8:
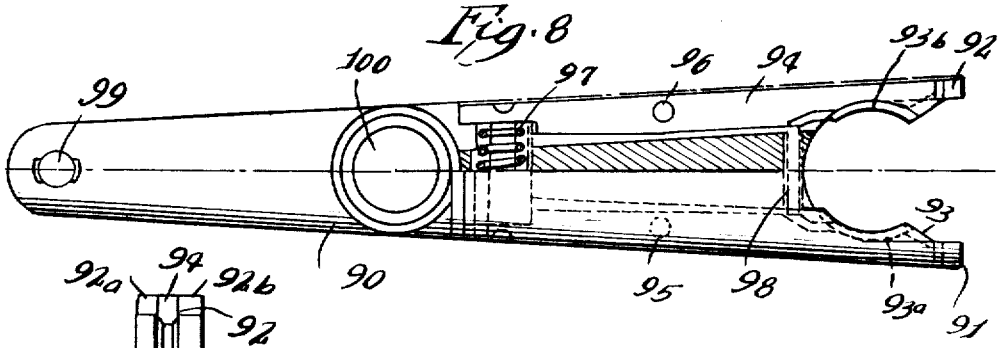
FIG. 8 is a front elevational detail view of a tool adapter gripper with parts in section.
Figure 9:
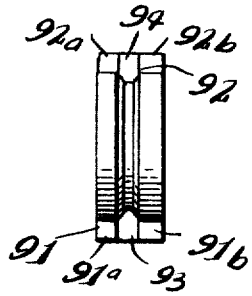
FIG. 9 is an end elevational view of the gripper shown in FIG. 8.

A tool supporting and handling gripper is shown in FIGS. 8 and 9 in which a body 90 has a forked end provided with legs 91 and 92 each of which are formed respectively into spaced parts 91a and 91b, 92a and 92b, which receive therebetween a pair of pivoted jaws 93 and 94 pivoted about pins 95 and 96, respectively, and urged together by a spring 97. The movement of the jaws toward each other is limited by a pin 98 carried in the body 90 and positioned to lie therebetween. Each of the jaws 93 and 94 is given a cross-sectional shape to closely fit the corresponding shape of the groove 81 in tool adapters 55 and is given a longitudinal shape as shown in FIG. 8 including a slightly concave section as indicated at 93 and 93b, respectively, to seat the adaptor in the gripper. The positioning of the jaws 93 and 94 between the parts 91a and 91b and 92a and 92b results in strengthening thereof to adequately take care of the forces incurred due to weight of tool overhang. The gripper body 90 has a pair of openings 99 and 100 extending therethrough, whereby the gripper may be operatively associated and become part of the tool changing mechanism 21 now to be described.

The tool changing mechanism 21 embodies a fixed base 110 located to a side of the machine tool 20 as shown in FIG. 2 in which a tool changer slide 111 is movably mounted on ways provided on the base 110 for movement toward the right as viewed in FIG. 2 to line up with a spindle of the machine tool. As shown generally in FIG. 2, the tool changing mechanism 21 embodies a rotatable mechanism carrying a plurality of the tool grippers 90 for rotation about a central axis 112.

Figure 5:
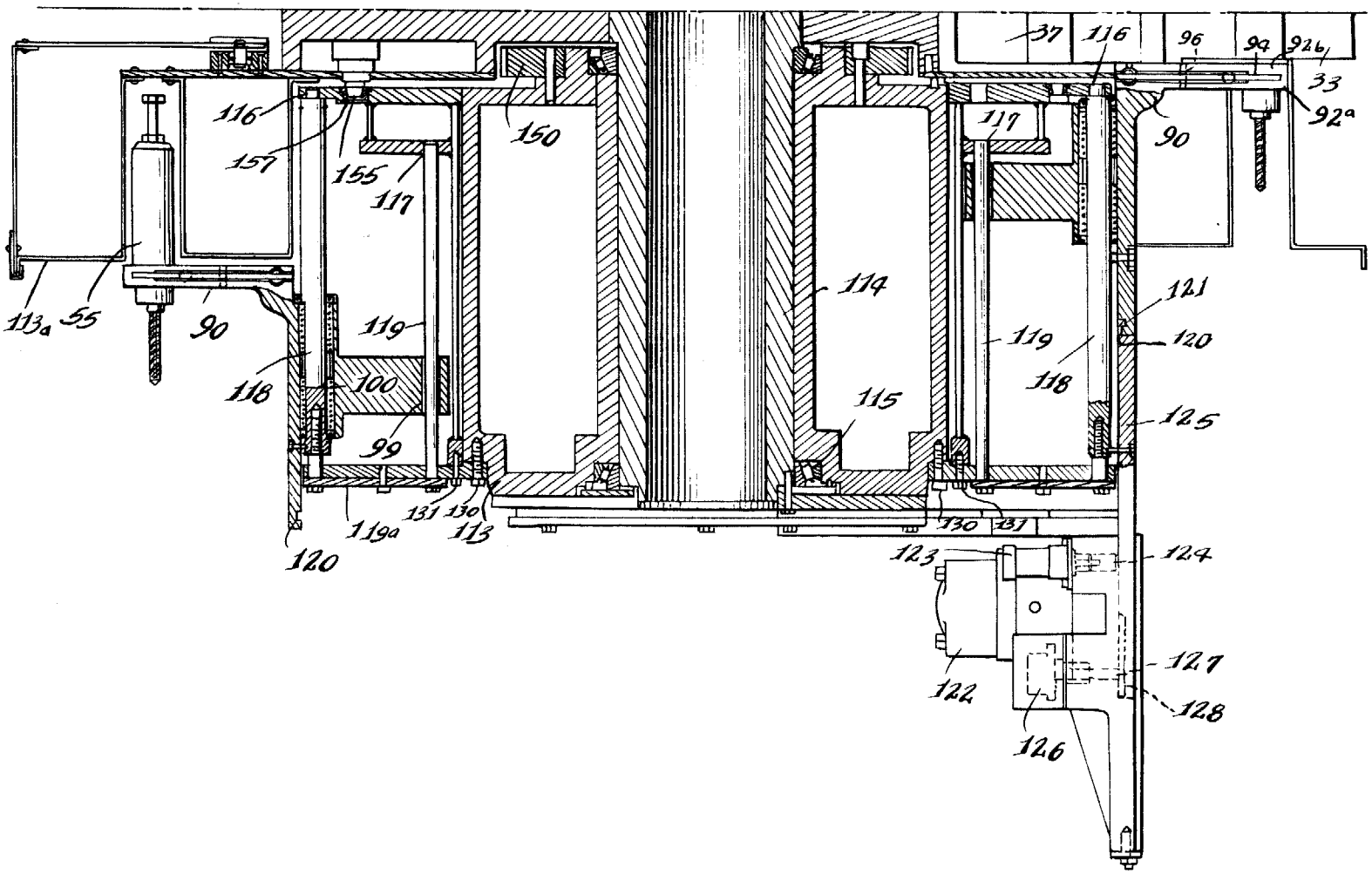
FIG. 5 is a horizontal section taken generally along the line 5—5 of FIG. 2 with the tool changing mechanism shown in operative position and a tool gripper positioned to locate an adapter in a fully seated position in the spindle corresponding to the adapter position shown in FIG. 4.

More particularly as shown in FIG. 5, a drum 113 is rotatably mounted by bearings 115 on a horizontally extending post 114 supported from the tool changing slide 111 and partially enclosed by a shield 113a. The drum 113 has a plurality of pairs of openings 116 and 117 with each pair arranged to receive a pair of rods 118 and 119 interconnected by a plate 119a which are received in the openings 99 and 100, respectively, of the tool gripper shown in FIG. 8 with the opening 100 having ball bushings to mount the gripper for free movement along the rods 118 and 119.

Each of the grippers 90 has an end extending forwardly or downwardly as viewed in FIG. 5 with a notch 120 formed therein whereby the gripper may be shifted from the withdrawn position shown at the left-hand side of FIG. 5 to a tool extending position shown at the right-hand side of FIG. 5. This operation is accomplished by the rotation of the drum 113 to position the notch 120 for engagement with a similar notch 121 in a rack bar which is shown in its gripper extending position in FIG. 5. The rack bar is driven from an hydraulic motor 122 in a direction to move horizontally or upwardly as shown in FIG. 5 to extend the gripper 90. A small hydraulic cylinder 123 is provided to operate a locking plunger 124 when a limit switch associated with the motor 122 senses the completion of rack bar 125 movement; however, a limit switch 126 has a plunger 127 associated with a groove 128 at the end of the rack bar 125 to sense that the tool adapter has gone into the spindle a sufficient distance to insure seating thereof and not merely that the adapter has been temporarily stopped by the key 66 which will pass into alignment with the keyway 77 in the adapter 55 upon slow rotation of the spindle. The rack bar lock 124 insures that the tool gripper 90 will remain in the proper extended location to return and pick up a tool adapter 55 from the spindle after completion of use thereof.

Selectivity is provided in the number of tool grippers 90 associated with the drum 113 by permitting the removal of an assembly including the rods 118, 119 and plate 119a by removal of the screws 130 and 131 which fasten the assembly to the drum whereby upon removal of the screws the plungers 118 and 119 may be withdrawn from openings 116 and 117 in which the ends of the rods are received. The tool drum 113 is provided with sufficient pairs of openings 116 and 117 to receive up to 60 of the grippers 90, however if a relatively large diameter tool is being used requiring a substantial amount of space, two or more pairs of adjacent openings 116 and 117 may be left open without a gripper associated therewith.

The drum 113 is rotated from a hydraulic motor 140 as shown in FIG. 6 through a gear transmission including gears 141, 142, 143, 144 and 145 on a plurality of rotatably mounted shafts 146, 147 and 148. The gear 145 at the output end of the gear train engages a gear 150 fixed to the drum 113. In order to provide for slowdown in final positioning of the drum 113, a cam 151 is mounted on the shaft 146 to coact with a follower 152 associated with a valve 153 whereby as the drum 113 approaches a desired rotative position the cam 151 causes operation of the valve 153 to provide for slow operation of the motor 140 by means of a hydraulic circuit, not shown. The drum 113 is held in a fixed position of adjustment by means of a plunger 155 mounted on the tool changer slide 111 which, when extended by means of the hydrulic cylinder 156, engages in an opening 157 in the drum 113 with there being as many of the openings 157 as there are pairs of openings 116 and 117 for tool grippers 90. Suitable interlocking switching indicated at 158 is provided to indicate full seating of the locking plunger 155.

The tool changer slide 111 as previously stated is mounted on ways on the base 110 and a hydraulic cylinder motor 159 is connected between the base and the slide whereby the tool storage drum 113 is caused to shift between the position shown in FIG. 2 and the position shown in FIG. 5, whereby to line up with either of the spindles 33 or 34 of the spindle head 32, with the spindle heads being disposed horizontally. In order to utilize the tool changer with the axial spindle head 36, means are provided to change the position of the slide moving cylinder 159 relative to base 110 to vary the position of the slide 111 relative to the spindle heads.

In operation, upon completion of a machining operation with a tool mounted in either the spindle 33 or spindle 34, the spindle head 32 is rotated to a horizontal disposition and the vertical saddle 26 brought to a proper position of elevation. The tool changing slide 111 is advanced to a tool exchanging position and a tool gripper 90 which has previously held the tool in the spindle is caused to have the jaws thereof engage in the supporting and handling groove 81 in the adapter 55 as a result of the gripper being held in its tool inserting position by the rack bar block 124. The rack bar motor 122 is then operated to retract the tool gripper 90 to a position such as that shown at the left-hand side of FIG. 5. Through operation of the tool storage drum motor 140 the storage drum 113 is then caused to rotate to bring another gripper 90 to a position in alignment with the spindle 33 or 34 and during the final positioning of the drum the lock pin 155 engages in the opening 157 in the drum 113 to securely position the drum and at the same time the notch 120 in the gripper inter-engages with the rack bar. The rack bar motor 122 is then operated to move the tool gripper 90 to extended position and during this movement the tool adapter 55 carried by the latter tool gripper is seated in the spindle with the tapered end 73 of the adapter facilitating insertion of the adapter into the spindle and the keyway 77 meshing with the key 66 in the spindle which extends through the collet 54. The seating movement of the adapter continues until the adjustable button which has been pre-set to obtain a desired over-all length for the tool is engaged with the bolt 76 in the spindle and the rack bar lock 124 then operates with the rack bar motor 122 being stopped. The tool changer slide 111 is then withdrawn by its hydraulic cylinder motor 159 to the position shown in FIG. 2 and the machine tool may then commence the desired cycle of operation with the tool that has been placed in association therewith.

We claim:

[1. A tool adapter comprising: a cylindrical body having an interior chamber opening to one end of the body to mount a tool with the working part of the tool remote from the adapter body, said body having means for holding the tool and body together, a stop carried by the body and positioned beyond the end thereof opposite from said interior chamber opening, and manually adjustable screw means connecting said stop to the adapter body to vary the distance of the stop from the last mentioned end of the body to set the over-all length of the tool and the adapter without adjusting the tool and adapter body relative to each other.]

2. A tool supporting adapter for establishing uniformity in tool handling requirements even though tools carried by different adapters may vary widely, said adapter having a cylindrical body with an interior chamber opening to an end of the body for mounting a tool to the adapter body, means on the adapter body for transport of the adapter comprising an annular handling groove on said body, said groove having a generally flat bottom and divergingly sloped sides to have a width greater at the top thereof than at the bottom, said top width being less than one-half the diameter of the adapter body and said groove being located closely adjacent the tool chamber opening to limit the amount of overhang when the adapter is in use in a spindle or the like.

[3. A tool adapter having a cylindrical body with a hollow interior for mounting a tool, said body having a keyway on the outer surface thereof extending lengthwise of the body and opening to an end of the body opposite from the tool supporting end of the adapter, said keyway having sloped sides extending generally radially of the body to lie in planes generally normal to the direction of force being applied whereby compression loads rather than twisting loads are applied to an interfitting key.]

4. A tool adapter having a cylindrical body with an interior chamber opening to one end of the body to mount a tool with the working part of the tool remote from the adapter body, said body having means for holding the tool and body together, a manually adjustable stop carried by the body beyond an end thereof opposite from said interior chamber opening for establishing the overall effective length of a tool and the adapter, *an annular tapered handling* [a tapered] groove in said body closely adjacent the end having the interior chamber opening to limit the amount of overhang when the adapter is in a spindle, said groove having a flat bottom and divergingly sloped sides to have a width greater at the top than at the bottom and a top width less than one-half the body diameter, and a keyway on the body extending lengthwise thereof having sloped sides to lie in planes generally normal to the direction of force being applied whereby compression loads rather than twisting loads are applied to an interfitting key.

*5. A tool supporting adapter for establishing uniformity in tool handling requirements even though tools carried by different adapters may vary widely, said adapter having a cylindrical body with an interior chamber opening to an end of the body for mounting a tool to the adapter body, means on the adapter body for transport of the adapter comprising an annualar handling groove on said body, said groove having a generally flat bottom and divergingly sloped sides to have a width greater at the top thereof than at the bottom, said top width being less than one-half the diameter of the adapter body and said groove being located closely adacent the tool chamber opening to limit the amount of overhang when the adapter is in use in a spindle or the like, a stop carried by the body and positioned beyond the end thereof opposite from said interior chamber opening, and manually adjustable screw means connecting said stop to the adapter body to vary the distance of the stop from the last mentioned end of the body to set the over-all length of the tool and the adapter without adjusting the tool and adapter body relative to each other.*

*6. A tool supporting adapter for establishing uniformity in tool handling requirements even though tools carried by different adapters may vary widely, said adapter having a cylindrical body with an interior chamber opening to an end of the body for mounting a tool to the adapter body, means on the adapter body for transport of the adapter comprising an annular handling groove on said body, said groove having a generally flat bottom and divergingly sloped sides to have a width greater at the top thereof than at the bottom, said top width being less than one-half the diameter of the adapter body and said groove being located closely adjacent to the tool chamber opening to limit the amount of overhang when the adapter is in use in a spindle or the like, said body having a keyway on the outer surface thereof extending lengthwise of the body and opening to an end of the body opposite from the tool supporting end of the adapter, said keyway having sloped sides extending generally radially of the body to lie in planes generally normal to the direction of force being applied whereby compression loads rather than twisting loads are applied to an interfitting key.*

References Cited

The following references, cited by the Examiner, are of record in the patented file of this patent or the original patent.

UNITED STATES PATENTS

| | | |
|---|---|---|
| 1,034,724 | 8/1912 | Mueller. |
| 1,074,025 | 9/1913 | Taylor. |
| 1,209,650 | 12/1916 | Eisler. |
| 1,268,386 | 6/1918 | Potter. |
| 2,901,927 | 9/1959 | Morgan. |
| 3,052,011 | 9/1962 | Brainard et al. |
| 3,052,999 | 9/1962 | Sedgwick. |
| 2,672,789 | 3/1954 | Cross et al. |
| 2,994,548 | 8/1961 | McGogy ---------- 287—52.05 |

FOREIGN PATENTS

| | | |
|---|---|---|
| 1,236,668 | 6/1960 | France. |
| 995,477 | 8/1951 | France. |

OTHER REFERENCES

Meyer, George J.: "Practical Suggestions," in American Machinist, Sept. 14, 1944, pp. 106-108.

Wright, Milton: "An Adapter for Spring Collets," in American Machinist 59:26, Dec. 27, 1923, p. 960.

ROBERT C. RIORDON, Primary Examiner

U.S. Cl. X.R.

29—568